R. B. DAY.
MOLD BREAKING APPARATUS.
APPLICATION FILED AUG. 22, 1918.

1,299,917.

Patented Apr. 8, 1919.
2 SHEETS—SHEET 1.

Inventor
Ralph B. Day
By
his Attorney.

R. B. DAY.
MOLD BREAKING APPARATUS.
APPLICATION FILED AUG. 22, 1918.
1,299,917.
Patented Apr. 8, 1919.
2 SHEETS—SHEET 2.
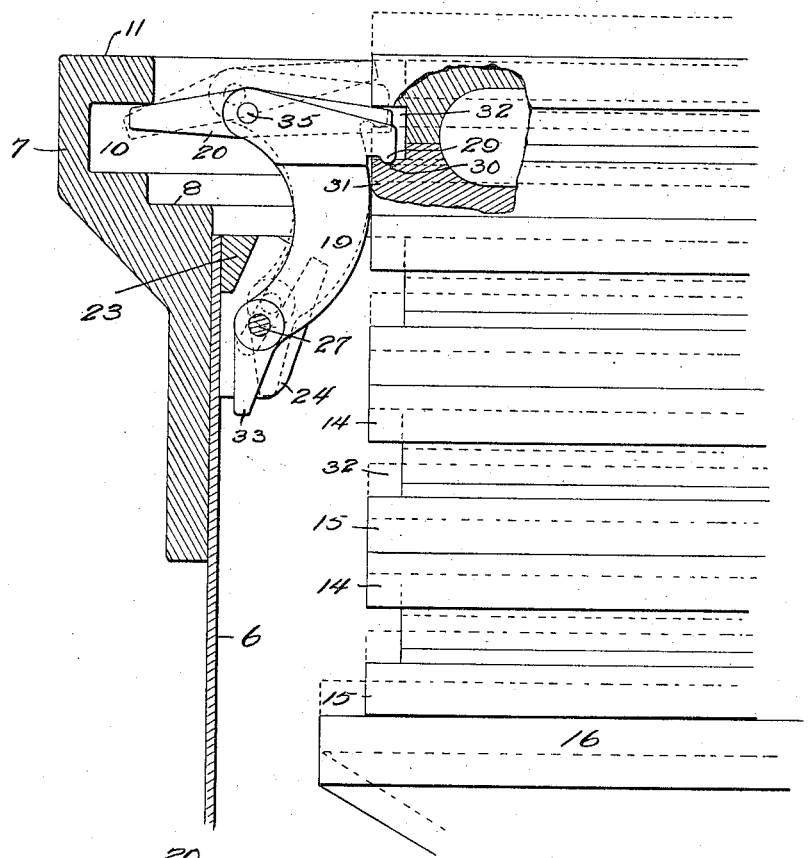
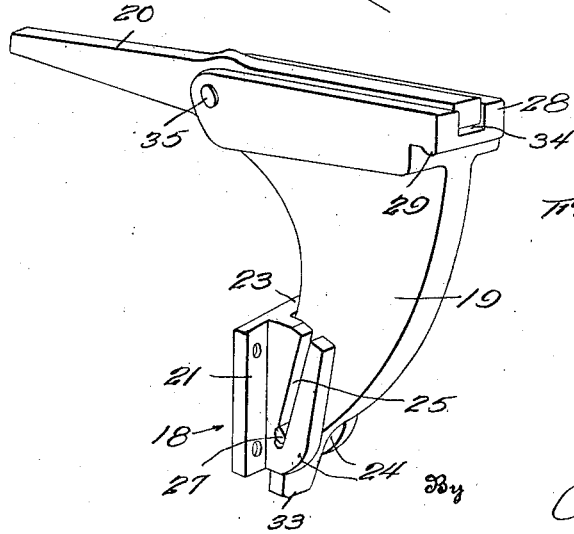
Inventor,
Ralph B. Day
By
his Attorney.

UNITED STATES PATENT OFFICE.

RALPH B. DAY, OF AKRON, OHIO, ASSIGNOR TO THE GOODYEAR TIRE & RUBBER COMPANY, OF AKRON, OHIO, A CORPORATION OF OHIO.

MOLD-BREAKING APPARATUS.

1,299,917. Specification of Letters Patent. Patented Apr. 8, 1919.

Application filed August 22, 1918. Serial No. 250,954.

*To all whom it may concern:*

Be it known that I, RALPH B. DAY, a citizen of the United States, and resident of Akron, Summit county, Ohio, have invented new and useful Improvements in Mold-Breaking Apparatus, of which the following is a specification.

This invention relates to improvements in devices for breaking apart mold sections which have previously been mated under pressure.

In the manufacture of rubber tires it is usual to place tire carcasses in molds and then apply pressure on a plurality of the molds which are placed in a heating chamber in order to "cure" the tire carcasses. After the tire carcasses have been cured, the sections of each mold are broken apart in order to remove the cured tires and replace with fresh carcasses.

Considerable manual labor is required to break apart the forced-together mold sections, and it is with the provision of a practical device for eliminating the necessity of the manual labor, and the expense incidental thereto, that this invention is concerned.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 3 is a partly broken sectional view to illustrate the operation of the device for breaking apart the mold sections; and Fig. 4 is a perspective view of the device *per se*.

Figure 1:
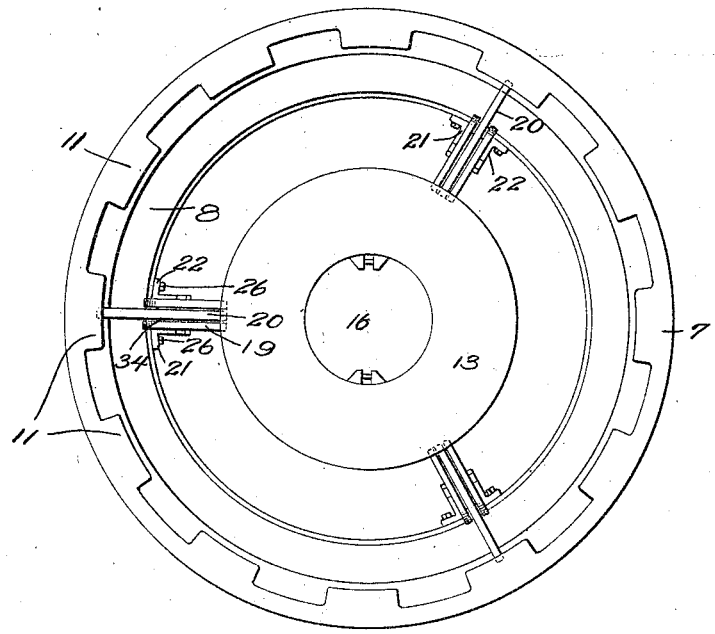
Figure 1 is a plan view of the uncovered top portion of a pot vulcanizer, showing the application of the invention for breaking apart the sections of molds before removal of the molds from the vulcanizer.
Figure 2:
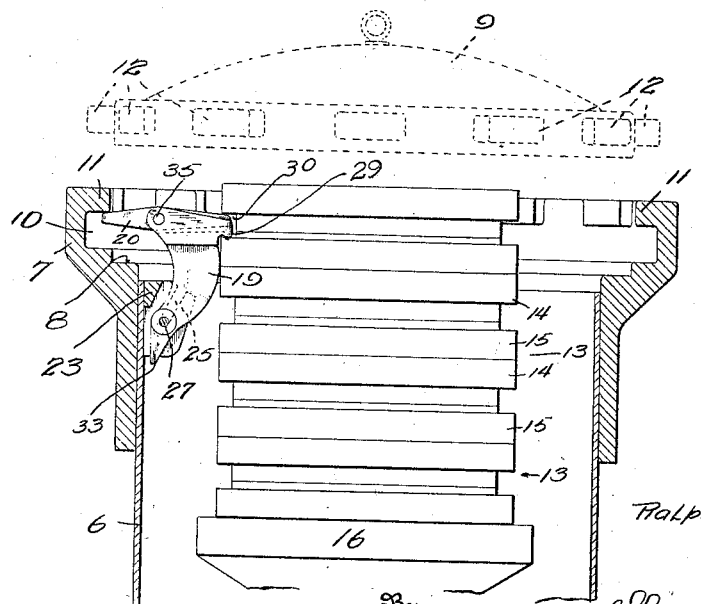
Fig. 2 is a partly broken vertical sectional view showing the vulcanizer, the molds, and my improved device for breaking apart sections of the molds, the removed cover or head for the vulcanizer being shown in dotted lines.

The vulcanizer 6 may be of any suitable or approved type, that shown in the drawing being cylindrical in form. The top part or mouth of the vulcanizing pot 6 is provided with an angular flange 7 which is preferably formed to provide a seat 8, a recess 10 offset from the seat 8, and lugs 11 over the recess 10. A cover or head 9, indicated by dotted lines in Fig. 2, is adapted to rest on the seat 8 in such a manner as to have the lugs 12 on said head disposed in the recess 10. The lugs 12 are adapted to bear against the undersides of the lugs 11, when the cover or head is partially turned on the seat 8, to lock the cover or head in position on the vulcanizing pot. When tire carcasses have been placed in the molds 13, a plurality of the molds are arranged in the vulcanizer 6 and pressure is applied to force together the sections 14 and 15 of the different molds. As shown, the molds can be placed one above the other on the head 16 of a suitable hydraulic ram which is adapted to move the molds upwardly against the head or cover 9 on the vulcanizer so that the desired pressure is exerted on the molds. The head 16 of the hydraulic ram is preferably movable either downwardly or upwardly in the vulcanizer 6 so that the molds 13 can be placed on or taken off of the head at the upper part or mouth of the vulcanizer.

After the tire carcasses have been "cured" in the vulcanizer, the cover or head 9 is removed and the hydraulic ram is operated to move the head 16 so that the molds can be conveniently taken out, one at a time, of the mouth of the vulcanizer. By first breaking apart the sections of the molds they can be more easily handled and removed from the vulcanizer.

My invention for automatically breaking apart the sections 14 and 15 of the molds 13 as herein specifically shown in a preferred embodiment, comprises the support 18; the arm 19 pivotally mounted on said support, and cam the bar 20 which is pivotally mounted on said arm 19. The support 18 preferably consists of plates 21 and 22 which are connected by a crosspiece 23 and have thereon brackets 24 which latter are provided with slots 25 cut at a slight angle to the vertical. The plates 21 and 22 are secured in the upper part of the heating chamber by means of bolts or cap screws 26. The arm 19 is provided at its lower part with pivot pins 27 which are adapted to play in the slots 25 of the brackets 24. The body portion of the arm is somewhat arcuate in shape and terminates in a thickened end portion provided at its upper inner end with the projection 28 preferably formed with a depending lip 29. The depending lip 29 is adapted to engage an annular depression 30 cut in the lower horizontal annular wall 31 of an annular groove 32 provided in the mold 13 at the junction of the sections 14 and 15 of the mold. A projection 33 at the lower end of the arm 19 is adapted to engage the inner wall of the vulcanizer 6 to limit the inward movement of the arm 19. The upper outer end of the arm 19 is bifurcated as at 34 for the reception of the cam bar 20 which plays upon a pivot pin 35.

From the foregoing, the construction and operation of the device will be apparent to those skilled in the art. It will be understood that when the cover 9 has been removed from the vulcanizer 6, the arms 19 of two or more of the devices 17 are positioned with the pivots 27 in the slots 25, and with the projections 28 and the inner end portions of the cam bars 20 disposed in the annular groove 32 of that mold 13 which is uppermost in position on the hydraulic ram head 16, and with the outer end portions of said cam bars 20 bearing against the lugs 11 on the vulcanizer 6, When the molds 13 are moved upwardly, the arms 19 which engage the lower section of the uppermost mold, are moved upward and at the same time the outer ends of the cam bars 20 being held against movement by the lugs 11, cause the inner ends to swing upwardly and press against the upper mold section 14. The upward movement of the inner ends of the cam bars is faster than the upward movement of the arms which bear against the lower mold section, and thus the upper mold section is disengaged and moved away from the lower mold section. In a like manner the successive molds on the head 16 are acted on by the devices, the latter being automatically positioned to operate on the topmost mold when the molds are moved upwardly to remove them from the vulcanizer.

The automatic return of the arms is caused by the action of the pins 27 in the slots 25 and the arcuate surfaces of the arms 19 in contact with the mold sections. It will be apparent that as the arms 19 move upwardly the slots 25 will act on the pins 27 and the arcuate surfaces will bear against the molds in such a manner as to cause the lower ends of the arms to move inwardly and at the same time the upper ends outwardly until the lugs 29 and the arms 20 are disengaged from the groove 32, whereupon the arms will drop to their initial position, ready for the next mold.

What I claim is:

1. A device for breaking apart the sections of a grooved mold in a vulcanizer, comprising a support, an arm movably mounted on said support and having a part thereof disposed in the groove of the mold, and a cam bar pivotally mounted on said arm and having one end portion thereof disposed in said groove and having the other end portion thereof bearing against a part of the vulcanizer.

2. A device for breaking apart the sections of a grooved mold in a vulcanizer, comprising a support provided with slots, an arm provided with a pivot arranged in said slots, said arm having a part thereof disposed in the groove of the mold, and a cam bar pivotally mounted on said arm and having one end portion thereof disposed in said groove and having the other end portion thereof bearing against a stationary part of the vulcanizer.

3. A device for breaking apart the sections of a grooved mold in a vulcanizer, comprising a support provided with inclined slots, an arm having a pivot at its lower end arranged in said slots, said arm curved inwardly upwardly and having a part thereof disposed in the groove of the mold, and a cam bar pivotally mounted on the upper portion of said arm, said cam bar having the inner end portion thereof disposed in said groove, and having the outer end portion thereof bearing against a stationary part on the vulcanizer.

4. A device for attachment to a vulcanizer to break apart the sections of a grooved mold, comprising a support attached to the heating chamber, an arm movably mounted on said support and having a part thereof disposed in the groove of the mold, and a cam bar pivotally mounted on said arm and having one end portion thereof extending into said groove and having the other end portion thereof disposed against a part of the vulcanizer.

5. A device for breaking apart the sections of a mold, comprising a stationary part, a movably mounted arm, and a bar movably mounted on said arm and adapted to bear against the mold and against said stationary part to break apart the sections of the mold when the latter is moved.

6. A device for breaking apart the sections of a grooved mold, comprising a stationary part, a movably mounted arm having a part thereof disposed in the groove of the mold, and a bar movably mounted on said arm and adapted to bear against one section of the mold and against said stationary part to break apart the sections of the mold when the mold is moved by suitable means.

7. A device for breaking apart the upper and lower sections of a mold, comprising a stationary part, a movably mounted arm having a part thereof bearing against the lower section of the mold, and a bar movably mounted on said arm and adapted to bear against the upper section of the mold and against said stationary part to break apart the sections of the mold when the mold is moved.

8. A device for breaking apart the sections of a mold comprising a stationary part, a support provided with slots, an arm bearing against the mold and having a pivot arranged in said slots, and a bar movably mounted on said arm and adapted to bear against the mold and against said stationary part to break apart the sections of the mold when the mold is moved by suitable means.

9. A device for breaking apart the sections of a mold, comprising a stationary part, a movably mounted arm having a part thereof bearing against the mold, and a bar pivotally mounted on said arm and adapted to bear against the mold and against said stationary part to break apart the sections of the mold when the mold is moved.

10. A device for breaking apart the upper section and the lower section of a mold, comprising a stationary part, a support provided with inclined slots, an arm bearing against the lower section, a bar pivotally mounted on said arm and adapted to bear against the upper section and against said stationary part to break apart the upper and lower sections of the mold when the latter is moved.

In witness whereof, I have hereunto signed my name in the presence of two subscribing witnesses.

RALPH B. DAY.

Witnesses:
   A. H. LIDDERS,
   E. C. LEADENHAM.